(12) United States Patent
Ando

(10) Patent No.: US 10,025,443 B2
(45) Date of Patent: Jul. 17, 2018

(54) TOUCH PANEL

(71) Applicant: Murata Manufacturing Co., Ltd., Nagaokakyo-shi, Kyoto-fu (JP)

(72) Inventor: Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/668,100

(22) Filed: Mar. 25, 2015

(65) Prior Publication Data
US 2015/0199056 A1 Jul. 16, 2015

Related U.S. Application Data

(63) Continuation of application No. PCT/JP2013/075253, filed on Sep. 19, 2013.

(30) Foreign Application Priority Data

Sep. 27, 2012 (JP) .................. 2012-213703

(51) Int. Cl.
G06F 3/045 (2006.01)
G06F 3/047 (2006.01)
G06F 3/044 (2006.01)

(52) U.S. Cl.
CPC .............. *G06F 3/047* (2013.01); *G06F 3/044* (2013.01); *G06F 2203/04103* (2013.01); *G06F 2203/04107* (2013.01); *G09G 2300/0426* (2013.01)

(58) Field of Classification Search
None
See application file for complete search history.

(56) References Cited

U.S. PATENT DOCUMENTS 6,433,841 B1 * 8/2002 Murade ............... G02F 1/13454
349/110
2002/0171634 A1 11/2002 Matsufusa
(Continued)

FOREIGN PATENT DOCUMENTS

JP 2000-183481 A 6/2000
JP 2009-169720 A 7/2009
(Continued)

OTHER PUBLICATIONS

International Search Report issued for PCT/JP2013/075253, dated Nov. 12, 2013.

*Primary Examiner* — Stephen T Reed
(74) *Attorney, Agent, or Firm* — Arent Fox LLP

(57) ABSTRACT

A touch panel having a structure in which first capacitance detection conductors, a first insulating layer, second capacitance detection conductors, a second insulating layer, a shied conductor, a third insulating layer, and backside wiring conductors are disposed in this order in a thickness direction. The second capacitance detection conductors and the backside wiring conductors are connected through conductors formed near ends of the second capacitance detection conductors in a longitudinal direction. The first capacitance detection conductors are extracted to a predetermined side by first extraction conductors, and the second capacitance detection conductors are extracted to the predetermined side by the through conductors, the backside wiring conductors, and second extraction conductors.

8 Claims, 7 Drawing Sheets

(56) References Cited

U.S. PATENT DOCUMENTS

| | | | |
|---|---|---|---|
| 2004/0256147 A1* | 12/2004 | Shigetaka | G06F 3/044 174/254 |
| 2008/0062140 A1* | 3/2008 | Hotelling | G09G 3/3648 345/173 |
| 2008/0225015 A1* | 9/2008 | Hashida | G06F 3/0418 345/173 |
| 2010/0214247 A1* | 8/2010 | Tang | H03K 17/98 345/173 |
| 2013/0002133 A1* | 1/2013 | Jin | G06F 1/1626 313/511 |
| 2014/0182894 A1* | 7/2014 | Liu | G06F 3/044 174/251 |
| 2015/0153881 A1* | 6/2015 | Misaki | G06F 3/044 345/174 |

FOREIGN PATENT DOCUMENTS

| | | |
|---|---|---|
| JP | 2012-27703 A | 2/2012 |
| JP | 5036913 B1 | 9/2012 |
| KR | 10-2010-0054899 A | 5/2010 |
| TW | 469401 B | 12/2001 |

* cited by examiner

TOUCH PANEL

CROSS REFERENCE TO RELATED APPLICATIONS

The present application is a continuation of International application No. PCT/JP2013/075253, filed Sep. 19, 2013, which claims priority to Japanese Patent Application No. 2012-213703, filed Sep. 27, 2012, the entire contents of each of which are incorporated herein by reference.

FIELD OF THE INVENTION

The present invention relates to a touch panel that detects an operation position on an operation surface with fingers or the like.

BACKGROUND OF THE INVENTION

Various types of touch panels that detect a touch position on an operation surface and perform an operation input according to the touch position have conventionally been proposed. A capacitance system having a configuration described in Patent Document 1 is popular for a detection of a touch position described above.

A touch panel (touch sensor) in Patent Document 1 includes a first electrode pattern and a second electrode pattern across an insulating layer. The first electrode pattern includes plural long electrodes extending in a first direction, and these plural long electrodes in the first electrode pattern are disposed with a predetermined space along a second direction orthogonal to the first direction. The second electrode pattern includes plural long electrodes extending in the second direction, and these plural long electrodes in the second electrode pattern are disposed with a predetermined space along the second direction orthogonal to the first direction.

The touch panel having the above configuration has to connect a detection signal detected by the first electrode pattern and the second electrode pattern to an external touch detection circuit (external circuit). For this, a drawing electrode for connecting the first and second electrode patterns to the external circuit is needed. The drawing electrode is conventionally formed around a region where the first and second electrode patterns are formed on the touch panel as described in Patent Document 1.

The drawing electrode for the first electrode pattern and the drawing electrode for the second electrode pattern are formed such that their terminal ends are located on the same side of the touch panel for facilitating the connection to the external circuit.

However, in the above conventional configuration, the drawing electrode is formed around the region where the first and second electrode patterns are formed, so that the region where the drawing electrode is formed is limited. Especially the drawing electrode for the electrode pattern that extends in the direction parallel to the side where the terminal end of the drawing electrode is located has a long drawing distance, so that a region that can be assigned to each drawing electrode becomes small. Accordingly, the drawing electrode is conventionally thinned as described in Patent Document 1.

Patent Document 1: Japanese Unexamined Patent Publication No. 2009-169720

SUMMARY OF THE INVENTION

With miniaturization of a portable electronic device to which a touch panel described above is mounted, a touch panel is demanded to be made compact. Therefore, it is preferable that as wide range as possible on a touch panel is used for detecting an operation.

However, when drawing electrodes are formed as described above, an area of a touch panel is increased by an area where the drawing electrodes are formed. On the other hand, when an area for detecting an operation is intended to be increased with a size of a touch panel unchanged, the drawing electrode has to be formed to be thinner. In this case, a resistance value of the drawing electrode is increased to increase a transmission loss of a detection signal, resulting in that detection performance is deteriorated.

In addition, when a liquid crystal display or the like is disposed on the back surface of the touch panel, translucency of the touch panel has to be increased. In this case, when the drawing electrode is intended to be thinned, the thickness of the drawing electrode has to be increased. When the thickness of the drawing electrode is increased, translucency is reduced, resulting in that the drawing electrode can visually be recognized (can be seen through). This might deteriorate an appearance of a touch panel that is demanded to have translucency, and hence, a meaning of having translucency is deteriorated.

An object of the present invention is to provide a touch panel that can reduce an area as much as possible without deteriorating touch detection performance.

A touch panel according to the present invention has following features. The touch panel includes first capacitance detection conductors, second capacitance detection conductors, a first insulating layer, a second insulating layer, a first extraction conductor, an operation-surface-side wiring conductor, backside wiring conductors, a layer-direction connection conductor, and a second extraction conductor. The plural first capacitance detection conductors have a shape extending along a first direction of an operation surface, and are disposed with a space along a second direction orthogonal to the first direction on the operation surface. The plural second capacitance detection conductors have a shape extending along the second direction, and are disposed with a space along the first direction. The first insulating layer is disposed between the plural first capacitance detection conductors and the plural second capacitance detection conductors in a direction orthogonal to the operation surface. The first extraction conductor has a terminal end and an end opposite to the terminal end, the terminal end disposed at one side of the operation surface in the first direction, and the end connected to the first capacitance detection conductor. The operation-surface-side wiring conductor has a shape projecting along the second direction from an end of the second capacitance detection conductor with a predetermined length. Each of the plural backside wiring conductors is formed corresponding to each of the plural second capacitance detection conductors via a second insulating layer, and is formed to be wider than the operation-surface-side wiring conductor. The layer-direction connection conductor connects the operation-surface-side wiring conductor and the backside wiring conductor. The second extraction conductor extracts the plural backside wiring conductors to one side of the operation surface in the first direction.

In this configuration, almost entire extraction conductive patterns for the second capacitance detection conductors are overlapped with the second capacitance detection conductors in a plan view of the operation surface. Therefore, the formation region of the extraction conductors for the second capacitance detection conductors can be reduced in a plan view of the operation surface, without decreasing the width of the extraction conductive patterns. Even if the first capacitance detection conductors and the second capacitance detection conductors are both extracted from the side of the operation surface in the direction in which the first capacitance detection conductors extend, the operation surface can be reduced without decreasing the width of the extraction conductive patterns.

The touch panel according to the present invention preferably has the following configuration. The first capacitance detection conductor, the second capacitance detection conductor, the first insulating layer, the second insulating layer, the first extraction conductor, the operation-surface-side wiring conductor, the backside wiring conductor, and the second extraction conductor are made of a material having translucency.

With this configuration, a touch panel having translucency can be implemented. This configuration can also prevent the extraction conductive patterns from being seen through, thereby implementing a good-looking touch panel.

In the touch panel according to the present invention, the layer-direction connection conductor is preferably made of a material having translucency.

With this configuration, a touch panel having excellent translucency can be realized as a whole.

In the touch panel according to the present invention, the layer-direction connection conductor is composed of a through conductor penetrating through the second insulating layer.

With this configuration using the through conductor, the region where only the extraction conductors are formed in a plan view of the operation surface can be reduced.

The touch panel according to the present invention may have the following configuration. The plural second capacitance detection conductors and the plural backside wiring conductors are arranged side by side on the same plane of the second insulating layer. The plural second capacitance detection conductors and the plural backside wiring conductors are connected with linear conductors. The plural second capacitance detection conductors and the plural backside wiring conductors are disposed across the second insulating layer by folding a region of the second insulating layer where the linear conductors are formed. The operation-surface-side wiring conductor and the layer-direction connection conductor are implemented by the linear conductors.

With this configuration, the region where only the extraction conductors are formed in a plan view of the operation surface can be reduced without using the through conductors. In addition, only a simple folding process is needed, whereby the touch panel can easily be produced.

The touch panel according to the present invention may have the following configuration. The plural first capacitance detection conductors and the plural second capacitance detection conductors are formed side by side on the same plane of the second insulating layer. A formation region of the plural first capacitance detection conductors and a formation region of the plural second capacitance detection conductors are disposed across the first insulating layer by folding an intermediate position between the formation region of the plural first capacitance detection conductors and the formation region of the plural second capacitance detection conductors on the second insulating layer, with the first insulating layer being sandwiched.

With this configuration, the first capacitance detection conductors, the second capacitance detection conductors, and the backside wiring conductors can be formed on a single insulating sheet. Therefore, a production process can be simplified.

In the touch panel according to the present invention, a shield conductor is preferably disposed between the plural second capacitance detection conductors and the backside wiring conductor.

This configuration can reduce an influence to the detection voltage detected by the first and second capacitance detection conductors from the backside wiring conductors. Therefore, highly-accurate detection of a touch position can be attained, while reducing an area of the operation surface as much as possible.

The present invention can reduce an area as much as possible without deteriorating touch detection performance.

DETAILED DESCRIPTION OF THE INVENTION

Figure 1:
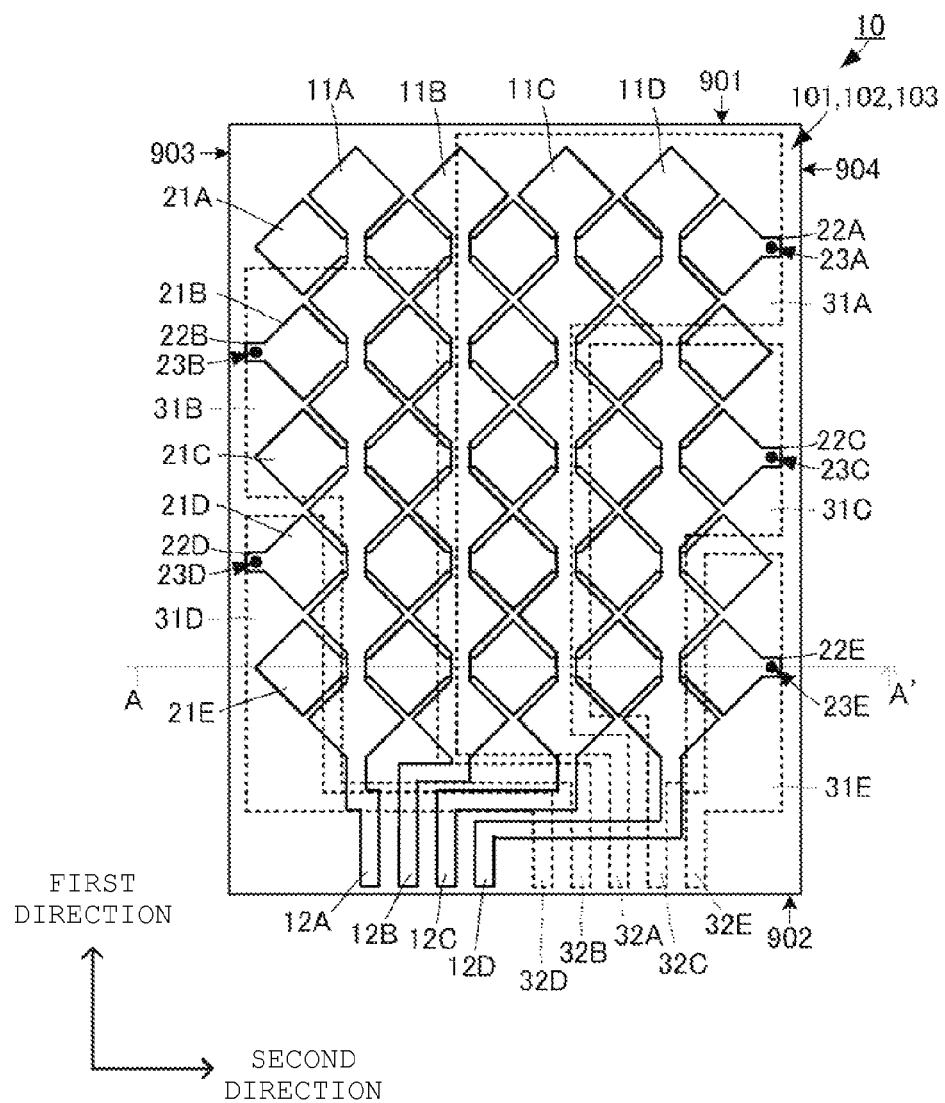
FIG. 1 is a plan view illustrating a touch panel according to a first embodiment of the present invention.
Figure 2:
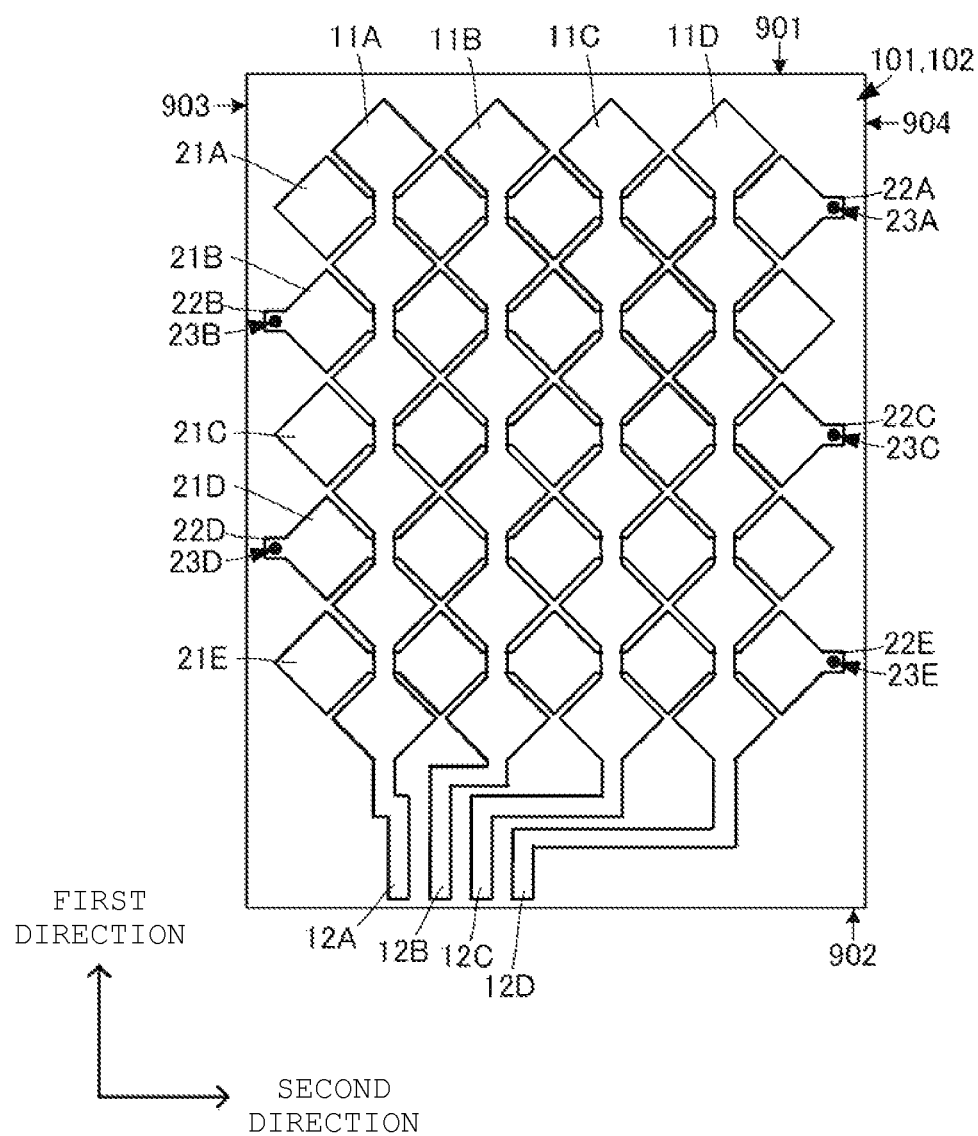
FIG. 2 is a front view illustrating the touch panel according to the first embodiment of the present invention.
Figure 3:
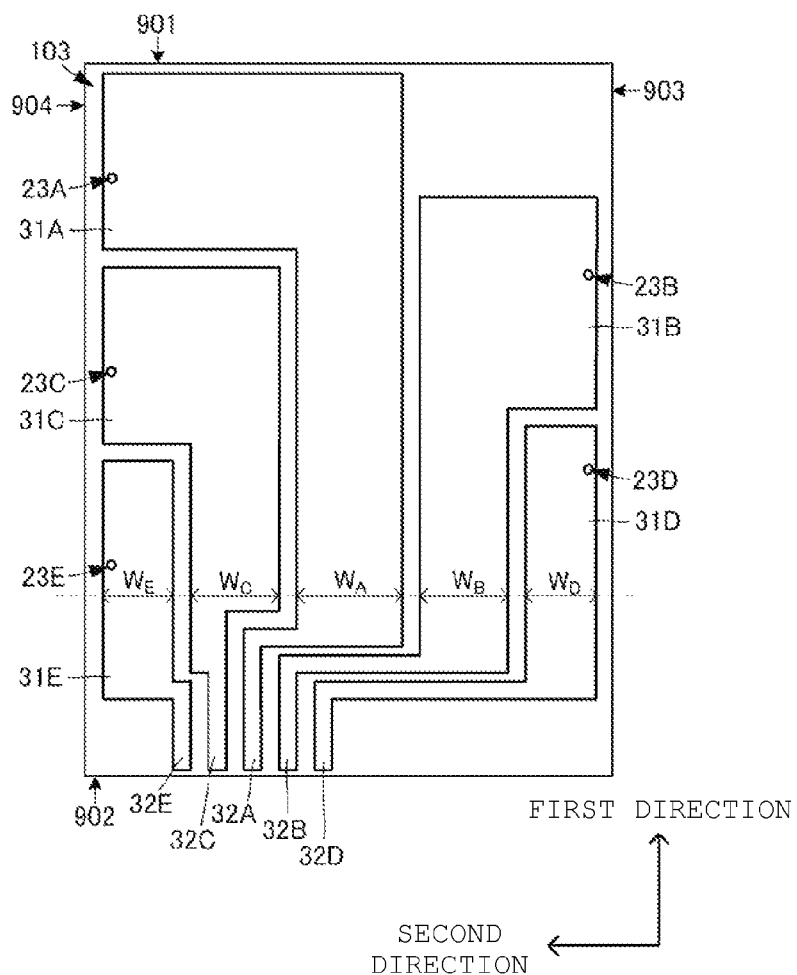
FIG. 3 is a back view illustrating the touch panel according to the first embodiment of the present invention.
Figure 4:
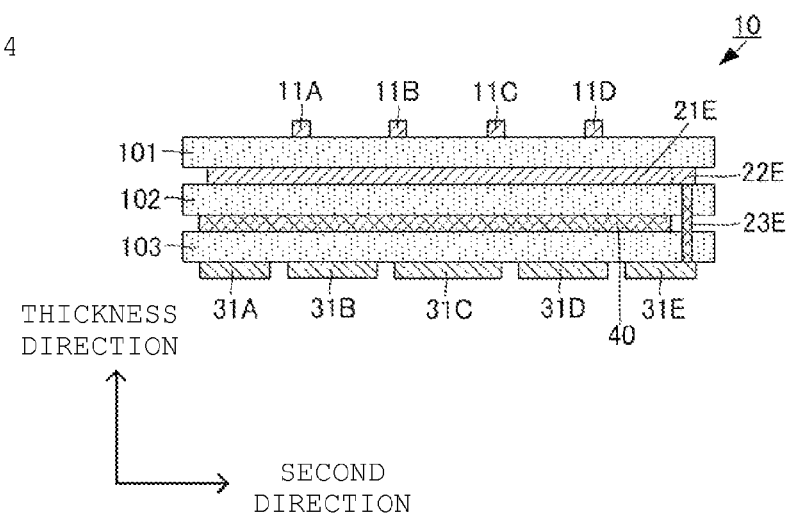
FIG. 4 is a sectional side view illustrating the touch panel according to the first embodiment of the present invention.

A touch panel according to a first embodiment of the present invention will be described with reference to the drawings. FIG. 1 is a plan view illustrating the touch panel according to the first embodiment of the present invention. FIG. 2 is a front view illustrating the touch panel according to the first embodiment of the present invention. FIG. 3 is a back view illustrating the touch panel according to the first embodiment of the present invention. FIG. 4 is a sectional side view illustrating the touch panel according to the first embodiment of the present invention. FIGS. 1, 2, 3 and 4 do not illustrate an insulating protection film. However, the insulating protection film is provided in an actual use. In addition, FIGS. 1 to 4 exaggeratingly illustrate a dimension of each component, especially a dimension in a thickness direction, for easy understanding of a positional relationship of each component.

A touch panel 10 includes a flat-type insulating layer 101. This insulating layer 101 corresponds to a "first insulating layer" in the present invention.

The insulating layer 101 is rectangular in a plan view. An outer periphery of the insulating layer 101 is composed of sides 901 and 902 extending in a direction (a direction parallel to a second direction) orthogonal to a first direction, and sides 903 and 904 extending in a direction (a direction parallel to the first direction) orthogonal to the second direction.

The insulating layer 101 is made of a material having translucency, such as PET, PEN, PLA, or acryl resin. The material of the insulating layer 101 preferably has high translucency.

As illustrated in FIGS. 1 and 2, first capacitance detection conductors 11A, 11B, 11C, and 11D (hereinafter referred to as 11A to 11D when collectively described) are formed on one main surface (flat surface) of the insulating layer 101. The first capacitance detection conductors 11A to 11D are made of a material having translucency. For example, the first capacitance detection conductors 11A to 11D are made of a transparent electrode formed from ITO, ZnO, silver nanowire electrode, carbon nanotube, or graphene. Alternatively, the first capacitance detection conductors 11A to 11D are made of an organic transparent electrode containing polythiophene or polyaniline as a main component.

The first capacitance detection conductors 11A to 11D have a long shape extending along the first direction. The first capacitance detection conductors 11A to 11D have a shape in which wide parts and narrow parts are alternately connected along the first direction (longitudinal direction).

The wide part is located at both ends of the first capacitance detection conductors 11A to 11D in the first direction. The wide parts of the first capacitance detection conductors 11A to 11D at the end close to the side 901 are formed to be as close as possible to the side 901. This distance is appropriately set according to a width of a bezel to which the touch panel 10 is fitted, positional accuracy in producing the first capacitance detection conductors 11A to 11D, or assembly accuracy of the touch panel 10.

The first capacitance detection conductors 11A to 11D are arranged with a predetermined space along the second direction.

First extraction conductors 12A, 12B, 12C, and 12D (hereinafter referred to as 12A to 12D when collectively described) are made of a linear conductor having a predetermined width. The first extraction conductors 12A to 12D are made of a material having translucency, like the first capacitance detection conductors 11A to 11D. It is preferable that the first extraction conductors 12A to 12D and the first capacitance detection conductors 11A to 11D are made of the same material. When being made of the same material, they can be simultaneously formed.

One end of each of the first extraction conductors 12A to 12D is connected to the wide part of the first capacitance detection conductors 11A to 11D at the end close to the side 902. Specifically, one end of the first extraction conductor 12A is connected to the wide part of the first capacitance detection conductor 11A at the end close to the side 902. One end of the first extraction conductor 12B is connected to the wide part of the first capacitance detection conductor 11B at the end close to the side 902. One end of the first extraction conductor 12C is connected to the wide part of the first capacitance detection conductor 11C at the end close to the side 902. One end of the first extraction conductor 12D is connected to the wide part of the first capacitance detection conductor 11D at the end close to the side 902.

The other ends of the first extraction conductors 12A to 12D almost reach the side 902 of the insulating layer 101. The other ends of the first extraction conductors 12A to 12D are arranged along the second direction with a predetermined space. The arrangement space is shorter than the arrangement space of the first capacitance detection conductors 11A to 11D. In the layout pattern described above, the first extraction conductors 12A to 12D are formed to be as short as possible.

Second capacitance detection conductors 21A, 21B, 21C, 21D, and 21E (hereinafter referred to as 21A to 21E when collectively described) are formed on the other main surface (flat surface) of the insulating layer 101 as illustrated in FIGS. 1 and 2. The second capacitance detection conductors 21A to 21E are made of a material having translucency. For example, the second capacitance detection conductors 21A to 21E are made of a transparent electrode formed from ITO, ZnO, silver nanowire electrode, carbon nanotube, or graphene. Alternatively, the second capacitance detection conductors 21A to 21E are made of an organic transparent electrode containing polythiophene or polyaniline as a main component.

The second capacitance detection conductors 21A to 21E have a long shape extending along the second direction. The second capacitance detection conductors 21A to 21E have a shape in which wide parts and narrow parts are alternately connected along the second direction (longitudinal direction).

The wide part is located at both ends of the second capacitance detection conductors 21A to 21E in the second direction. The wide parts of the second capacitance detection conductors 21A to 21E at an end close to the side 903 and the wide parts at an end close to the side 904 are both formed to be as close as possible to the sides 903 and 904. This distance is appropriately set according to a width of a bezel to which the touch panel 10 is fitted, positional accuracy in producing the second capacitance detection conductors 21A to 21E, production accuracy of later-described operation-surface-side wiring conductors or through conductors, or assembly accuracy of the touch panel 10.

The second capacitance detection conductors 21A to 21E are arranged with a predetermined space along the first direction. In this case, the second capacitance detection conductors 21A to 21E and the first capacitance detection conductors 11A to 11D are formed such that the narrow parts of the second capacitance detection conductors 21A to 21E and the narrow parts of the first capacitance detection conductors 11A to 11D are overlapped with each other in a plan view of the touch panel 10 (as viewed from a direction orthogonal to the main surface of the insulating layer 101).

Operation-surface-side wiring conductors 22A, 22B, 22C, 22D, and 22E (hereinafter referred to as 22A to 22E when collectively described) have a shape projecting from the wide part of each of the second capacitance detection conductors 21A to 21E by a predetermined amount along the second direction. Specifically, the operation-surface-side wiring conductor 22A has a shape of projecting from the wide part of the second capacitance detection conductor 21A at the end close to the side 904 toward the side 904. The operation-surface-side wiring conductor 22B has a shape of projecting from the wide part of the second capacitance detection conductor 21B at the end close to the side 903 toward the side 903. The operation-surface-side wiring conductor 22C has a shape of projecting from the wide part of the second capacitance detection conductor 21C at the end close to the side 904 toward the side 904. The operation-surface-side wiring conductor 22D has a shape of projecting from the wide part of the second capacitance detection conductor 21D at the end close to the side 903 toward the side 903. The operation-surface-side wiring conductor 22E has a shape of projecting from the wide part of the second capacitance detection conductor 21E at the end close to the side 904 toward the side 904.

The operation-surface-side wiring conductors 22A to 22E are made of a material having translucency, like the second capacitance detection conductors 21A to 21E. It is preferable that the operation-surface-side wiring conductors 22A to 22E and the second capacitance detection conductors 21A to 21E are made of the same material. When being made of the same material, they can be simultaneously formed.

An insulating layer 102 is arranged at the opposite side of the insulating layer 101 across the second capacitance detection conductors 21A to 21E and the operation-surface-side wiring conductors 22A to 22E. In other words, the second capacitance detection conductors 21A to 21E and the operation-surface-side wiring conductors 22A to 22E are sandwiched between the insulating layer 101 and the insulating layer 102 along the thickness direction of the touch panel 10.

The insulating layer 102 is also rectangle in a plan view, similar to the insulating layer 101. The insulating layer 102 may have almost the same shape as the insulating layer 101 in a plan view. Similar to the insulating layer 101, the insulating layer 102 is made of a material having translucency, such as PET, PEN, PLA, or acryl resin. The material of the insulating layer 102 also preferably has high translucency.

A shield conductor 40 is disposed on the surface of the insulating layer 102 opposite to the surface where the second capacitance detection conductors 21A to 21E and the operation-surface-side wiring conductors 22A to 22E are formed. The shield conductor 40 is formed on almost the entire surface of the insulating layer 102. Similar to the above each conductor, the shield conductor 40 is made of a material having translucency.

An insulating layer 103 is disposed opposite to the insulating layer 102 across the shield conductor 40. In other words, the shield conductor 40 is sandwiched between the insulating layer 102 and the insulating layer 103 along the thickness direction of the touch panel 10.

The insulating layer 103 is also rectangle in a plan view, similar to the insulating layers 101 and 102. The insulating layer 103 may have almost the same shape as the insulating layers 101 and 102 in a plan view. Similar to the insulating layers 101 and 102, the insulating layer 103 is made of a material having translucency, such as PET, PEN, PLA, or acryl resin. The material of the insulating layer 103 also preferably has high translucency.

Backside wiring conductors 31A, 31B, 31C, 31D, and 31E (hereinafter referred to as 31A to 31E when collectively described) are made of a material having translucency as illustrated in FIGS. 1 and 3. For example, the backside wiring conductors 31A to 31E are made of a transparent electrode formed from ITO, ZnO, silver nanowire, carbon nanotube, or graphene. Alternatively, the backside wiring conductors 31A to 31E are made of an organic transparent electrode containing polythiophene or polyaniline as a main component.

The backside wiring conductors 31A to 31E have a long shape extending mainly along the first direction. The backside wiring conductors 31A to 31E are formed to be wider than the operation-surface-side wiring conductors 22A to 22E. The backside wiring conductors 31A to 31E are formed to have an area as wide as possible.

The backside wiring conductor 31A is formed to be overlapped with the formation region of the operation-surface-side wiring conductor 22A in a plan view of the touch panel 10. The backside wiring conductor 31B is formed to be overlapped with the formation region of the operation-surface-side wiring conductor 22B in a plan view of the touch panel 10. The backside wiring conductor 31C is formed to be overlapped with the formation region of the operation-surface-side wiring conductor 22C in a plan view of the touch panel 10. The backside wiring conductor 31D is formed to be overlapped with the formation region of the operation-surface-side wiring conductor 22D in a plan view of the touch panel 10. The backside wiring conductor 31E is formed to be overlapped with the formation region of the operation-surface-side wiring conductor 22E in a plan view of the touch panel 10.

The backside wiring conductors 31A, 31B, and 31C have a shape in which the width is changed along the way, wherein the width close to the side 901 is larger than the width close to the side 902. The backside wiring conductors 31A to 31E may be formed such that the conductor drawn from a position more apart from the side 902 becomes wider. For example, as illustrated in FIG. 3, the width $W_A$ of the backside wiring conductor 31A is larger than the width $W_B$ of the backside wiring conductor 31B, and the width $W_B$ of the backside wiring conductor 31B is larger than the width $W_C$ of the backside wiring conductor 31C, at almost the same position along the first direction. The width $W_C$ of the backside wiring conductor 31C is larger than the width $W_D$ of the backside wiring conductor 31D, and the width $W_D$ of the backside wiring conductor 31D is larger than the width $W_E$ of the backside wiring conductor 31E. With this configuration, a difference in resistance values among the backside wiring conductors 31A to 31E due to the difference in extraction length can be reduced. Thus, a difference in a detection voltage depending on a position can be reduced, whereby detection performance can be enhanced.

Second extraction conductors 32A, 32B, 32C, 32D, and 32E (hereinafter referred to as 32A to 32E when collectively described) are made of a linear conductor having a predetermined width. The second extraction conductors 32A to 32E are made of a material having translucency, like the backside wiring conductors 31A to 31E. It is preferable that the second extraction conductors 32A to 32E and the backside wiring conductors 31A to 31E are made of the same material. When being made of the same material, they can be simultaneously formed.

One end of each of the second extraction conductors 32A to 32E is connected to the end of each of the backside wiring conductors 31A to 31E at the side close to the side 902. Specifically, one end of the second extraction conductor 32A is connected to the end of the backside wiring conductor 31A at the side close to the side 902. One end of the second extraction conductor 32B is connected to the end of the backside wiring conductor 31B at the side close to the side 902. One end of the second extraction conductor 32C is connected to the end of the backside wiring conductor 31C at the side close to the side 902. One end of the second extraction conductor 32D is connected to the end of the backside wiring conductor 31D at the side close to the side 902. One end of the second extraction conductor 32E is connected to the end of the backside wiring conductor 31E at the side close to the side 902.

The other ends of the second extraction conductors 32A to 32E almost reach the side 902. The other ends of the second extraction conductors 32A to 32E are arranged along the second direction with a predetermined space. The arrangement space may be almost equal to the arrangement space of the first extraction conductors 12A to 12D. The second extraction conductors 32A to 32E are arranged side by side with the first extraction conductors 12A to 12D in a plan view of the touch panel 10.

Through conductors 23A to 23E are formed to respectively connect the operation-surface-side wiring conductors 22A to 22E and the backside wiring conductors 31A to 31E. Specifically, the through conductor 23A is formed to penetrate from the operation-surface-side wiring conductor 22A to the backside wiring conductor 31A along the thickness direction of the touch panel 10. The through conductor 23B is formed to penetrate from the operation-surface-side wiring conductor 22B to the backside wiring conductor 31B along the thickness direction of the touch panel 10. The through conductor 23C is formed to penetrate from the operation-surface-side wiring conductor 22C to the backside wiring conductor 31C along the thickness direction of the touch panel 10. The through conductor 23D is formed to penetrate from the operation-surface-side wiring conductor 22D to the backside wiring conductor 31D along the thickness direction of the touch panel 10. The through conductor 23E is formed to penetrate from the operation-surface-side wiring conductor 22E to the backside wiring conductor 31E along the thickness direction of the touch panel 10.

The through conductors 23A to 23E are formed by embedding silver paste or silver nanowire into a through-hole. Thus, the through conductors 23A to 23E also have translucency.

With this configuration, when an operator touches the surface of the touch panel 10, capacitance between the first capacitance detection conductors 11A to 11D and the second capacitance detection conductors 21A to 21E, which are on the touch position or close to the touch position, is changed. The touch position can be detected by acquiring a detection voltage caused by this change.

According to this configuration in the present embodiment, even if the detection voltage generated between the first capacitance detection conductors 11A to 11D extending in the first direction and the second capacitance detection conductors 21A to 21E extending in the second direction is extracted from the side 902 that is one end in the first direction on the operation surface, most of the extraction conductor patterns for the second capacitance detection conductors 21A to 21E are formed on the backside of the touch panel 10. Therefore, it is unnecessary to form the extraction conductor patterns for the second capacitance detection conductors 21A to 21E around the formation region of the first capacitance detection conductors 11A to 11D and the second capacitance detection conductors 21A to 21E in a plan view of the touch panel 10, as in the conventional art. Consequently, the touch panel 10 can be formed to have a small area in a plan view.

In addition, the width of the extraction conductor pattern for each of the second capacitance detection conductors 21A to 21E (the width of each of the backside wiring conductors 31A to 31E) can be increased, whereby resistance values of the extraction conductor patterns can be reduced. Thus, the detection voltage is difficult to be attenuated, whereby the detection performance can be enhanced.

In addition, since the width of each of the backside wiring conductors 31A to 31E can be increased, the thickness of the backside wiring conductors 31A to 31E can be reduced. This configuration can prevent the backside wiring conductors 31A to 31E from being seen through, whereby a touch panel 10 with a good appearance can be formed.

Notably, the shield conductor 40 can be omitted. However, arranging the shield conductor 40 can prevent an influence by the backside wiring conductors 31A to 31E to the voltage generated by the first capacitance detection conductors 11A to 11D and the second capacitance detection conductors 21A to 21E. Thus, detection accuracy of the touch position can further be enhanced.

Figure 5:
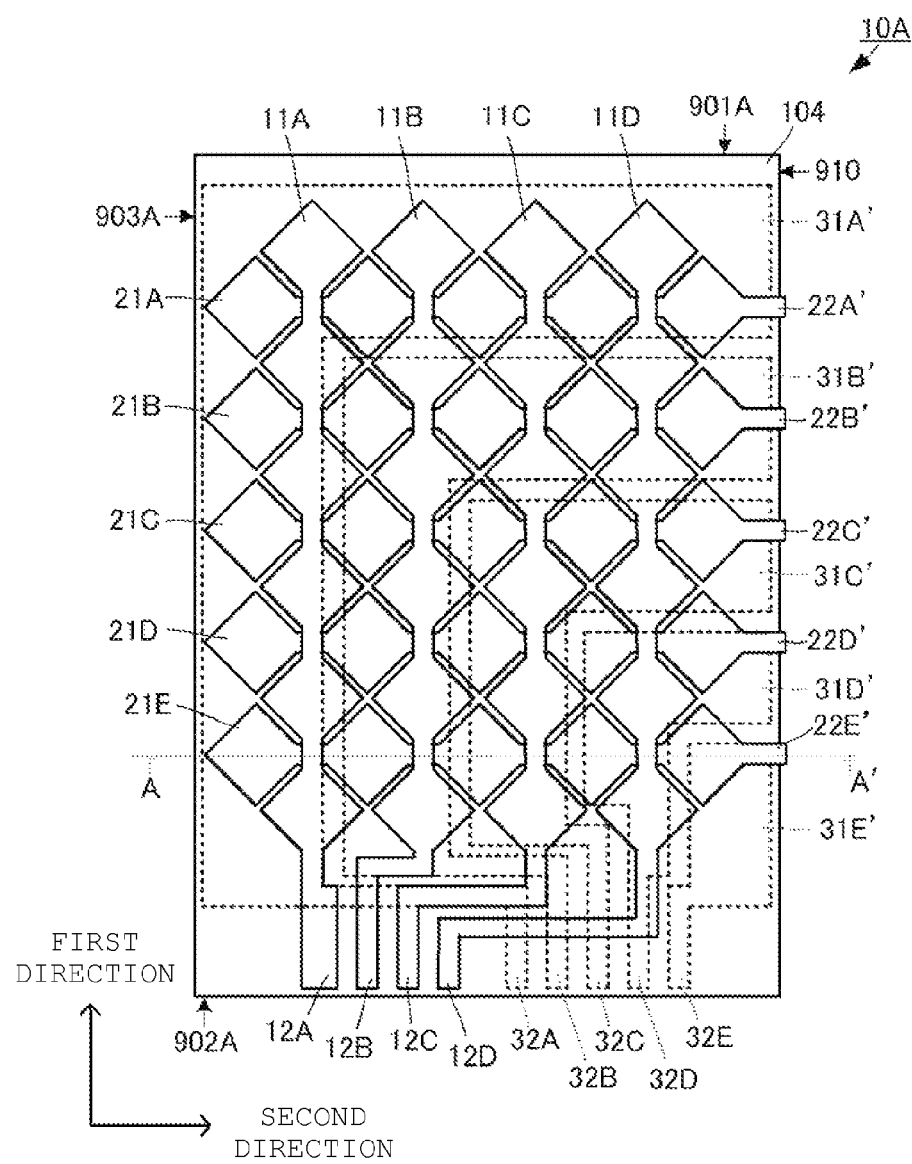
FIG. 5 is a plan view illustrating a touch panel according to a second embodiment of the present invention.
Figure 6:
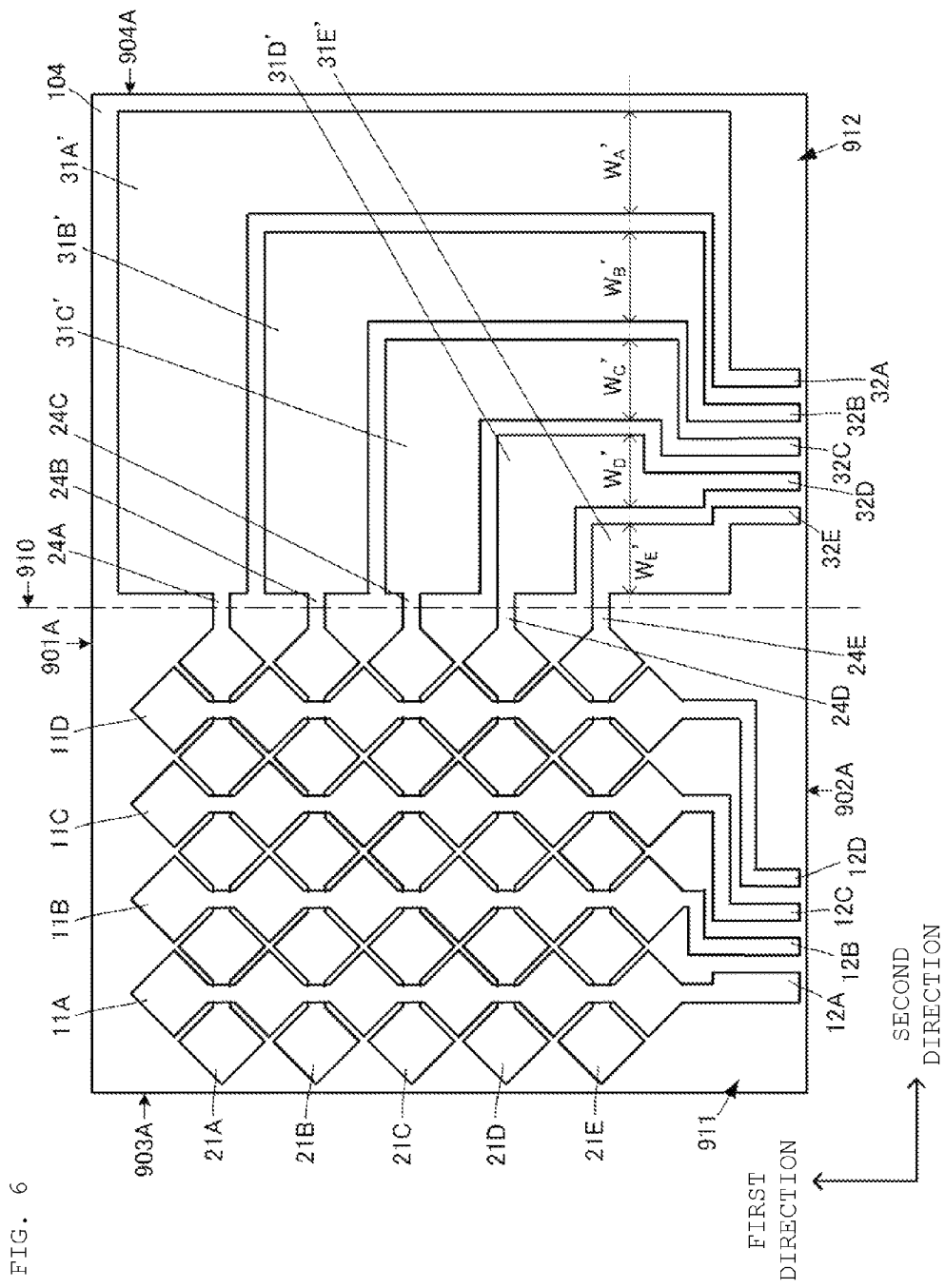
FIG. 6 is a plan view illustrating the touch panel according to the second embodiment of the present invention before a folding process.
Figure 7:
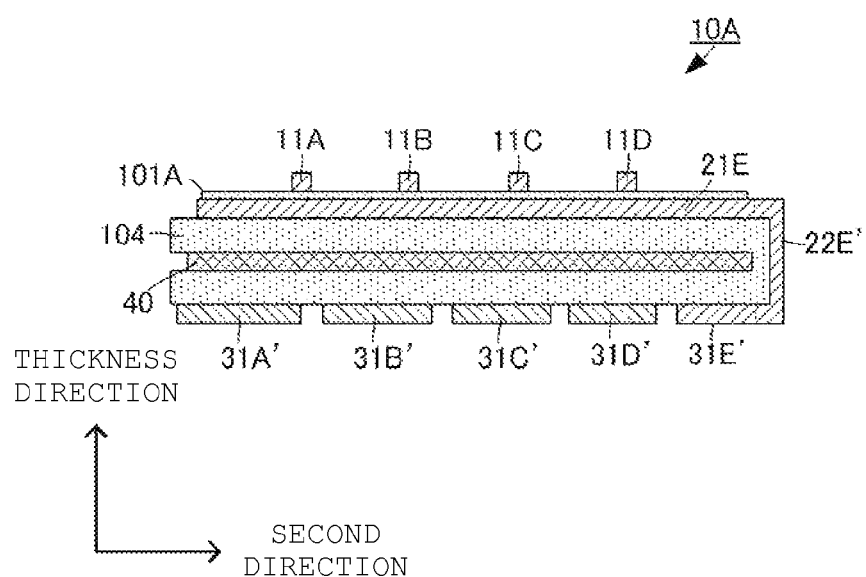
FIG. 7 is a sectional side view illustrating the touch panel according to the second embodiment of the present invention.

Next, a touch panel according to a second embodiment will be described with reference to the drawings. FIG. 5 is a plan view illustrating a touch panel according to the second embodiment of the present invention. FIG. 6 is a plan view illustrating the touch panel according to the second embodiment of the present invention before a folding process. FIG. 7 is a sectional side view illustrating the touch panel according to the second embodiment of the present invention.

In a touch panel 10A according to the present embodiment, the configurations of the first capacitance detection conductors 11A to 11D, the first extraction conductors 12A to 12D, and the second capacitance detection conductors 21A to 21E are the same as those in the touch panel 10 according to the first embodiment. Therefore, the detailed description of these components will be omitted.

An insulating layer 101A is disposed between both the first capacitance detection conductors 11A to 11D and the first extraction conductors 12A to 12D and the second capacitance detection conductors 21A to 21E.

An insulating layer 104 is disposed with respect to the second capacitance detection conductors 21A to 21E at the side opposite to the insulating layer 101A. The insulating layer 104 has translucency, like the insulating layer 102 illustrated in the first embodiment. The insulating layer 104 has an area twice the area of the insulating layer 102 illustrated in the first embodiment. In this case, the insulating layer 104 corresponds to a shape in which the side corresponding to the side 904 of the insulating layer 102 in the first embodiment is increased. Therefore, the distance from a side 903A to a side 904A of the insulating layer 104 along the second direction is twice the distance from the side 903 to the side 904 of the insulating layer 102 in the first embodiment along the second direction. A line extending along the first direction at the center along the second direction is defined as a centerline 910. A region from the centerline 910 to the side 903A of the insulating layer 104 is defined as a first region 911, while a region from the centerline 910 to the side 904A of the insulating layer 104 is defined as a second region 912. An area of the first region 911 and an area of the second region 912 are almost equal to each other.

The above first capacitance detection conductors 11A to 11D, the first extraction conductors 12A to 12D, and the second capacitance detection conductors 21A to 21E are formed on the first region 911 as illustrated in FIG. 6.

Connection conductors 24A to 24E are formed from the first region 911 to the second region 912 of the insulating layer 104 over the centerline 910. The connection conductors 24A to 24E have a long shape extending along the second direction. The connection conductor 24A is connected to the wide part of the second capacitance detection conductor 21A at the side close to the centerline 910. The connection conductor 24B is connected to the wide part of the second capacitance detection conductor 21B at the side close to the centerline 910. The connection conductor 24C is connected to the wide part of the second capacitance detection conductor 21C at the side close to the centerline 910. The connection conductor 24D is connected to the wide part of the second capacitance detection conductor 21D at the side close to the centerline 910. The connection conductor 24E is connected to the wide part of the second capacitance detection conductor 21E at the side close to the centerline 910. The connection conductors 24A to 24E are also made of a material having translucency. In this case, the connection conductors 24A to 24E may be made of the material same as the material of the second capacitance detection conductors 21A to 21E.

Backside wiring conductors 31A' to 31E' and the second extraction conductors 32A to 32E are formed on the second region 912 of the insulating layer 104 as illustrated in FIG. 6. The backside wiring conductors 31A' to 31E' and the second extraction conductors 32A to 32E are formed on the same surface as the second capacitance detection conductors 21A to 21E. The backside wiring conductors 31A' to 31E' are also made of a material having translucency.

The backside wiring conductors 31A' to 31E' have a shape extending mainly along the first direction. The backside wiring conductors 31A' to 31E' are formed to be wider than the connection conductors 24A to 24E. The backside wiring conductors 31A' to 31E' are formed to have an area as wide as possible in the second region 912.

Portions of the backside wiring conductors 31A' to 31E' extending along the first direction are arranged in the order of the backside wiring conductor 31E', the backside wiring conductor 31D', the backside wiring conductor 31C', the backside wiring conductor 31B', and the backside wiring conductor 31A' along the second direction from the centerline 910.

One end of the backside wiring conductor 31A' is connected to the connection conductor 24A, and the other end is connected to the second extraction conductor 32A. A portion of the backside wiring conductor 31A' at the side close to the connection conductor 24A (at the side close to one end) has a shape extending along the second direction, and a portion at the side close to the second extraction conductor 32A (at the side close to the other end) has a shape extending along the first direction.

One end of the backside wiring conductor 31B' is connected to the connection conductor 24B, and the other end is connected to the second extraction conductor 32B. A portion of the backside wiring conductor 31B' at the side close to the connection conductor 24B (at the side close to one end) has a shape extending along the second direction, and a portion at the side close to the second extraction conductor 32B (at the side close to the other end) has a shape extending along the first direction.

One end of the backside wiring conductor 31C' is connected to the connection conductor 24C, and the other end is connected to the second extraction conductor 32C. A portion of the backside wiring conductor 31C' at the side close to the connection conductor 24C (at the side close to one end) has a shape extending along the second direction, and a portion at the side close to the second extraction conductor 32C (at the side close to the other end) has a shape extending along the first direction.

One end of the backside wiring conductor 31D' is connected to the connection conductor 24D, and the other end is connected to the second extraction conductor 32D. A portion of the backside wiring conductor 31D' at the side close to the connection conductor 24D (at the side close to one end) has a shape extending along the second direction, and a portion at the side close to the second extraction conductor 32D (at the side close to the other end) has a shape extending along the first direction.

One end of the backside wiring conductor 31E' is connected to the connection conductor 24E, and the other end is connected to the second extraction conductor 32E. The backside wiring conductor 31E' has a shape extending along the first direction.

The second extraction conductors 32A to 32E are linear conductors having bent portions, according to need, as in the first embodiment. An end of each of the second extraction conductors 32A to 32E is arranged along the second direction with a predetermined space near the end 902A, as in the first embodiment.

The width of the portion extending in the second direction may be longer than the width of the portion extending in the first direction in each of the backside wiring conductors 31A' to 31D'.

The backside wiring conductors 31A' to 31E' may be formed such that the width of each of the portions, extending along the first direction, of the conductor drawn from a position more apart from the side 902A becomes wider. For example, as illustrated in FIG. 6, the width $W_A'$ of the backside wiring conductor 31A' is larger than the width $W_B'$ of the backside wiring conductor 31B', and the width $W_B'$ of the backside wiring conductor 31B' is larger than the width $W_C'$ of the backside wiring conductor 31C'. The width $W_C'$ of the backside wiring conductor 31C' is larger than the width $W_D'$ of the backside wiring conductor 31D', and the width $W_D'$ of the backside wiring conductor 31D' is larger than the width $W_E'$ of the backside wiring conductor 31E'. With this configuration, a difference in resistance values among the backside wiring conductors 31A' to 31E' due to the difference in extraction length can be reduced. Thus, a difference in a detection voltage depending on a position can be reduced, whereby detection performance can be enhanced.

With this configuration, when the insulating layer 104 is folded to bond the surfaces of the insulating layer 104, on which no conductors are formed, to each other along the centerline 910, the touch panel 10A in which each conductor has the same layer structure can be formed with the same area as the first embodiment in a plan view as illustrated in FIGS. 5 and 7. Upon this folding, with the shield conductor 40 being disposed at the region where the insulating layer 104 is folded and overlapped, the layer structure same as that of the touch panel 10 according to the first embodiment can be realized.

By using the configuration of the present embodiment, the configuration electrically same as that of the touch panel 10 according to the first embodiment can be attained only by folding the insulating layer, without providing a through conductor. Thus, a touch panel can be produced with a more simple process.

In addition, the second capacitance detection conductors, the connection conductors, the backside wiring conductors, and the second extraction conductors are collectively formed on the same plane of the insulating layer, whereby the production process can be simplified. In the present embodiment, it is preferable to use an electrode having high resistance to bending and made of silver nanowire, carbon nanotube, or graphene, or a material containing polythiophene or polyaniline as a main component for the transparent electrodes. A small amount of conductive paste may be applied to the bent portion for avoiding conductive failure due to damage of the electrode at the folding portion.

Figure 8:
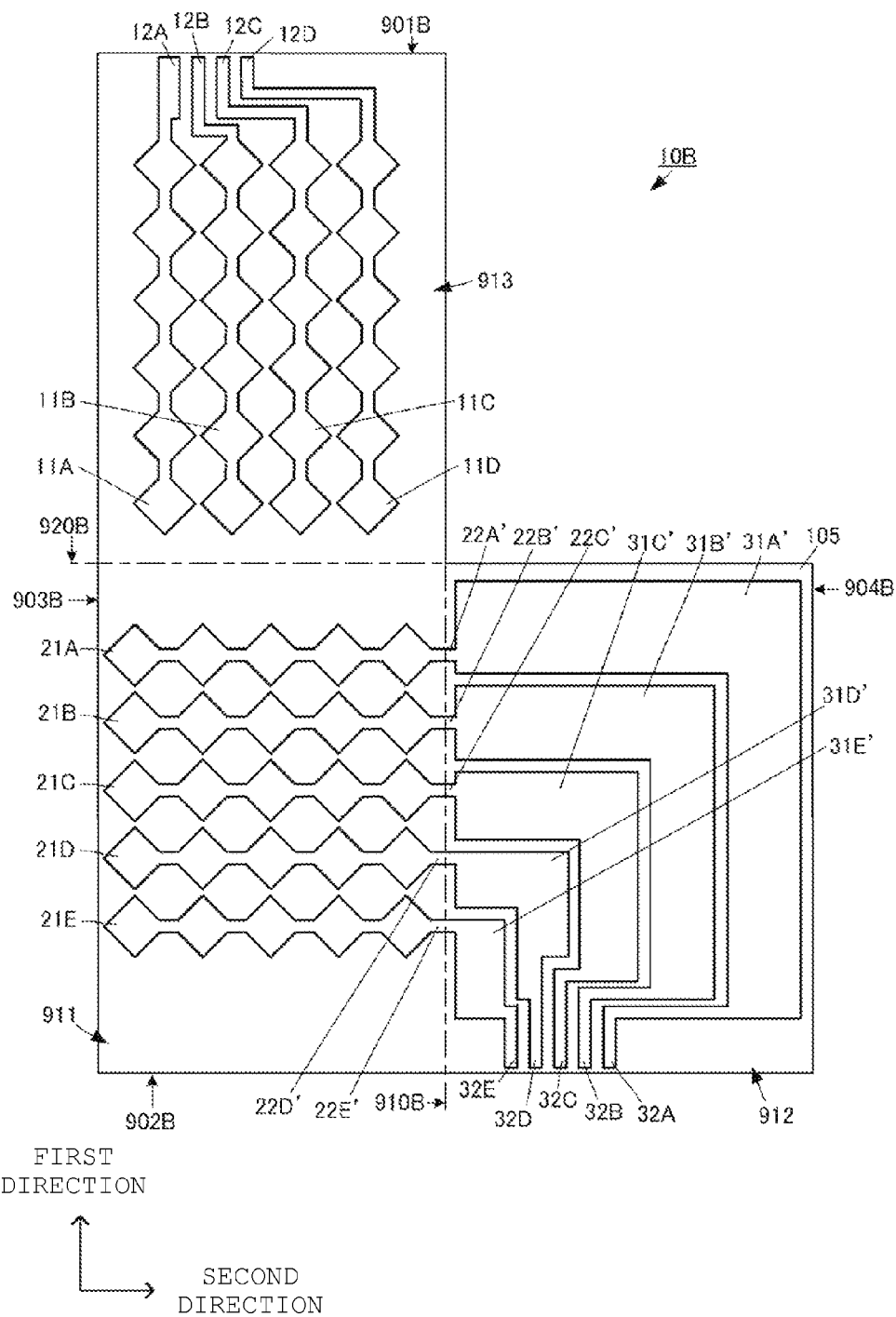
FIG. 8 is a plan view illustrating a touch panel according to a third embodiment of the present invention before a folding process.

Next, a touch panel according to a third embodiment of the present invention will be described with reference to the drawings. FIG. 8 is a plan view illustrating a touch panel according to the third embodiment of the present invention before a folding process. A touch panel 10B according to the present embodiment is formed by mounting all conductors on an insulating layer 105 and folding the insulating layer 105. The basic structure is the same as the touch panel 10A according to the second embodiment. Therefore, only different portions will be described in detail.

An insulating layer 105 has a shape including a third region 913 extending from the first region 911 along the first direction by an area same as the first region 911, compared to the insulating layer 104 in the second embodiment. A boundary between the first region 911 and the third region 913 is defined as a centerline 920B.

The first capacitance detection conductors 11A to 11D and the first extraction conductors 12A to 12D are formed on the region 913. In this case, the first extraction conductors 12A to 12D are formed close to the side 901B (the side opposite to the centerline 911B) with respect to the first capacitance detection conductors 11A to 11D.

With this configuration, the insulating layer 105 is folded such that the surfaces on which no conductors are formed are bonded to each other along the centerline 910B and the surfaces on which the conductors are formed are bonded to each other along the centerline 920B. In this case, the shield conductor 40 is disposed at the side where the surfaces of the insulating layer 105 having no conductors formed thereon are bonded to each other along the centerline 910B, and the insulating layer 101 is disposed at the side where the surfaces of the insulating layer 105 having the conductors formed thereon are bonded to each other.

With this configuration, the touch panel 10B in which each conductor has the same layer structure can be formed with the same area as the first embodiment in a plan view.

By using the configuration of the present embodiment, the configuration electrically same as that of the touch panel 10 according to the first embodiment can be attained only by folding the insulating layer, without providing a through conductor, as in the second embodiment. Thus, a touch panel can be produced with a more simple process.

In addition, all conductors are collectively formed on the same plane of the insulating layer, whereby the production process can be simplified. In the present embodiment, it is preferable to use an electrode having high resistance to bending and made of silver nanowire, carbon nanotube, or graphene, or a material containing polythiophene or polyaniline as a main component for the transparent electrodes. A small amount of conductive paste may be applied to the bent portion for avoiding conductive failure due to damage of the electrode at the folding portion.

The present embodiment describes the case in which the first capacitance detection conductors 11A to 11D and the first extraction conductors 12A to 12D are formed on the same plane as the second capacitance detection conductors and the like. However, the first capacitance detection conductors 11A to 11D and the first extraction conductors 12A to 12D may be formed on the opposite surface of the insulating layer 105. In this case, the insulating layer 101 does not have to be separately inserted, whereby the production can be more simplified.

The second and third embodiments describe the structure in which the shield conductor 40 is inserted. However, a pattern may preliminarily be formed on the back surface of the first region or the second region of the insulating layer.

DESCRIPTION OF REFERENCE SYMBOLS 10, 10A, 10B TOUCH PANEL
101, 102, 103, 104 INSULATING LAYER
11A~11D FIRST CAPACITANCE DETECTION CONDUCTOR
12A~12D FIRST EXTRACTION CONDUCTOR
21A~21E SECOND CAPACITANCE DETECTION CONDUCTOR
22A~22E OPERATION-SURFACE-SIDE WIRING CONDUCTOR
23A~23E THROUGH CONDUCTOR
24A~24E CONNECTION CONDUCTOR
31A~31E, 31A'~31E' BACKSIDE WIRING CONDUCTOR
32A~32E SECOND EXTRACTION CONDUCTOR
40 SHIELD CONDUCTOR
901, 902, 903, 904, 901A, 902A, 903A, 904A SIDE
910, 910B, 920B CENTERLINE
911 FIRST REGION
912 SECOND REGION
913 THIRD REGION

The invention claimed is:

1. A touch panel, comprising:
an insulating layer having first and second major surfaces opposing one another;
the insulating layer being bent back on itself at first and second positions to define first, second and third subsections each bounded by respective portions of the first and second major surfaces, the insulating layer being bent back upon itself such that the portion of the second major surface bounding the third subsection faces the portion of the first major surface bounding the first subsection and the portion of the second major surface bounding the first subsection faces the portion of the second major surface bounding the second subsection;
a plurality of elongated first touch sensor electrodes located on a portion of the first major surface bounding the first subsection, the first touch sensor electrodes extending parallel to one another along a first direction and being spaced from each other along a second direction which is orthogonal to the first direction;
a plurality of elongated second touch sensor electrodes located on the portion of the first major surface bounding the second subsection, the second touch sensor electrodes extending parallel to one another along the second direction and being spaced from each other along the first direction;
a plurality of first extraction conductors, each first extraction conductor extending from a respective one of the first touch sensor electrodes;
a plurality of backside wiring conductors formed on the portion of the first major surface bounding the third subsection, each backside wiring conductor corresponding to a respective one of the plurality of second touch sensor electrodes and being electrically coupled thereto; and
a plurality of second extraction conductors, each second extraction conductor extending from a respective one of the backside wiring conductors.

2. The touch panel according to claim 1, wherein the plurality of first touch sensor electrodes, the plurality of second touch sensor electrodes, the first insulating layer, the second insulating layer, the plurality of first extraction conductors, the plurality of backside wiring conductors, and the plurality of second extraction conductors are made of translucent materials.

3. The touch panel according to claim 2, wherein each of the backside wiring conductors is electrically connected to a respective one of the second touch sensor electrodes by a respective connection conductor made of a translucent material.

4. The touch panel according to claim 1, wherein each of the respective connection conductors are located on the first surface of the first insulating layer and extends from the portion of the first major surface bounding the second subsection to the portion of the first major surface bounding the third subsection.

5. The touch panel according to claim 1, wherein the first and third subsection include respective signal transaction edges which align with one another, each first extraction conductor extending from its respective first touch sensor electrode to a position adjacent the signal extraction edge of the first subsection and each second extraction conductor extending from its respective backside wiring conductor to a position adjacent the signal extraction edge of the third subsection.

6. The touch panel according to claim 1, wherein each of the backside wiring layers has a fixed width portion that extends in the second direction, each of the fixed width portions having has a width as measured along a single line extending in the first direction through all of the fixed width portions of the backside wiring layers, the width of each respective backside wiring layer being different than at least one other backside wiring layer.

7. The touch panel according to claim 6, wherein each backside wiring layer is electrically coupled to its respective second touch sensor electrodes at a respective connection location, some of the connection locations being closer to the signal extraction edge of the second insulating layer than the others, the width of each respective backside wiring layer, as measured along the single line varying from backside wiring layer to backside wiring layer as a function of the distance between the respective connection location of the respective backside wiring layer and the signal extraction edge of the second insulating layer.

8. The touch panel according to claim 1, wherein at least some of the backside wiring layers extend in the first direction and have a variable width as measured in the second direction.

\* \* \* \* \*